UNITED STATES PATENT OFFICE.

LEONARD SAYWELL TARRANT, OF HAWERA, NEW ZEALAND.

SUBMARINE OR UNDER-WATER PAINT.

1,247,901.     Specification of Letters Patent.     Patented Nov. 27, 1917.

No Drawing.     Application filed January 12, 1916. Serial No. 71,634.

*To all whom it may concern:*

Be it known that I, LEONARD SAYWELL TARRANT, a citizen of the Dominion of New Zealand, and residing at Hawera, in the Provincial District of Taranaki, in the Dominion of New Zealand, have invented certain new and useful Improvements in Submarine or Under-Water Paints, of which the following is a specification.

This invention relates to paints used for coating ships' bottoms and structures or articles or materials to be used under the surface of water, and provides a paint which resists the growth of seaweed and animalculæ, is cheap to manufacture and is much more durable than paints at present in use.

The paint consists of animals' blood, linseed oil, resin, and a pigment.

The ingredients are used in the following proportions:—

| | |
|---|---|
| Animals' blood | 11 gallons. |
| Raw linseed oil | 4 gallons. |
| Resin | 30 ounces. |
| Pigment as required to obtain any desired tint. | |

A thick mixture consisting of the pigment and linseed oil is first made, and this mixture is placed over any convenient heating apparatus until the said mixture is on the point of boiling. The resin is then added and thoroughly mixed by agitation. A quantity of animals' blood is then added to the mixture, the quantity being such that it will not materially lower the temperature of the mixture, which is thoroughly stirred until the blood is well mixed with the linseed oil, pigment and resin. Similar quantities of blood and oil are then added alternately, care being taken not to reduce materially the temperature of the mixture, and to finish with oil as the last ingredient added to the mixture.

The shreds of fibrin are removed by a preliminary stirring of the blood by hand or otherwise. This stirring results in the shreds of fibrin adhering to the hand or the implement used for that purpose.

What I do claim and desire to secure by Letters Patent of the United States is:—

1. A submarine paint comprising animal blood, from which the fibrin has been removed, linseed oil, resin and pigment.

2. A submarine paint composition comprising animal blood from which the fibrin has been removed, resin and pigment mixed with raw linseed oil at substantially the boiling point of the oil.

3. A submarine paint comprising animal blood from which the fibrin has been removed eleven gallons, raw linseed oil four gallons, resin thirty ounces and pigment.

In testimony whereof I have signed my name to this specification in the presence of two witnesses.

LEONARD SAYWELL TARRANT.

Witnesses:
   E. JOAN COLLEY,
   JAMES ANDERSON HARDIE.

Copies of this patent may be obtained for five cents each, by addressing the "Commissioner of Patents, Washington, D. C."